United States Patent
Langhammer et al.

(10) Patent No.: US 7,698,358 B1
(45) Date of Patent: Apr. 13, 2010

(54) PROGRAMMABLE LOGIC DEVICE WITH SPECIALIZED FUNCTIONAL BLOCK

(75) Inventors: Martin Langhammer, Alderburry (GB); Leon Zheng, San Jose, CA (US); Chiao Kai Hwang, Fremont, CA (US); Gregory Starr, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1429 days.

(21) Appl. No.: 10/746,448

(22) Filed: Dec. 24, 2003

(51) Int. Cl.
*G06F 7/38* (2006.01)

(52) U.S. Cl. ...................................... 708/523; 708/230

(58) Field of Classification Search ................ 708/230, 708/518, 625, 627
See application file for complete search history.

(56) References Cited

U.S. PATENT DOCUMENTS

| | | | |
|---|---|---|---|
| 3,473,160 A | 10/1969 | Wahlstrom | 326/41 |
| 4,799,004 A | 1/1989 | Mori | 714/726 |
| 4,871,930 A | 10/1989 | Wong et al. | 326/39 |
| 4,912,345 A | 3/1990 | Steele et al. | 326/39 |
| 5,122,685 A | 6/1992 | Chan et al. | 326/41 |
| 5,128,559 A | 7/1992 | Steele | 326/38 |
| RE34,363 E | 8/1993 | Freeman | 326/38 |
| 5,349,250 A | 9/1994 | New | 326/44 |
| 5,371,422 A | 12/1994 | Patel et al. | 326/41 |
| 5,483,178 A | 1/1996 | Costello et al. | 326/41 |
| 5,570,039 A | 10/1996 | Oswald et al. | 326/39 |
| 5,689,195 A | 11/1997 | Cliff et al. | 326/41 |
| 5,751,164 A | 5/1998 | Sharpe-Geisler et al. | 326/38 |
| 5,754,459 A | 5/1998 | Telikepalli | 708/627 |
| 5,812,562 A | 9/1998 | Baeg | 714/726 |
| 5,825,202 A | 10/1998 | Tavana et al. | 326/39 |
| 5,874,834 A | 2/1999 | New | 326/39 |
| 5,880,981 A | 3/1999 | Kojima et al. | 708/523 |
| 5,991,898 A | 11/1999 | Rajski et al. | 714/30 |
| 5,999,015 A | 12/1999 | Cliff et al. | 326/39 |
| 6,060,903 A | 5/2000 | Rangasayee et al. | 326/39 |
| 6,069,487 A | 5/2000 | Lane et al. | 326/37 |
| 6,078,941 A | 6/2000 | Jiang et al. | 708/625 |

(Continued)

FOREIGN PATENT DOCUMENTS

EP 0 167 047 1/1986

(Continued)

OTHER PUBLICATIONS

Altera Corp., "Implementing Multipliers in FLEX 10K EABs" (Mar. 1996).

(Continued)

*Primary Examiner*—Chuong D Ngo
(74) *Attorney, Agent, or Firm*—Ropes & Gray LLP; Jeffrey H. Ingerman

(57) ABSTRACT

In a programmable logic device having a specialized functional block incorporating multipliers and adders, multiplication operations that do not fit neatly into the available multipliers are performed partially in the multipliers of the specialized functional block and partially in multipliers configured in programmable logic of the programmable logic device. Unused resources of the specialized functional block, including adders, may be used to add together the partial products produced inside and outside the specialized functional block. Some adders configured in programmable logic of the programmable logic device also may be used for that purpose.

34 Claims, 4 Drawing Sheets

U.S. PATENT DOCUMENTS

| | | | | |
|---|---|---|---|---|
| 6,154,049 | A | 11/2000 | New | 326/39 |
| 6,169,419 | B1 | 1/2001 | De et al. | 326/58 |
| 6,172,518 | B1 | 1/2001 | Jenkins, IV et al. | 326/37 |
| 6,215,326 | B1 | 4/2001 | Jefferson et al. | 326/41 |
| 6,255,848 | B1 | 7/2001 | Schultz et al. | 326/41 |
| 6,259,275 | B1 | 7/2001 | Beiu | 326/112 |
| 6,286,024 | B1 | 9/2001 | Yano et al. | 708/625 |
| 6,404,225 | B1 | 6/2002 | Rangasayee | 326/39 |
| 6,404,226 | B1 | 6/2002 | Schadt | 326/41 |
| 6,407,576 | B1 | 6/2002 | Ngai et al. | 326/41 |
| 6,523,055 | B1 * | 2/2003 | Yu et al. | 708/603 |
| 6,538,470 | B1 | 3/2003 | Langhammer et al. | 326/41 |
| 6,556,044 | B2 | 4/2003 | Langhammer et al. | 326/40 |
| 6,628,140 | B2 | 9/2003 | Langhammer et al. | 326/40 |
| 6,711,602 | B1 * | 3/2004 | Bhandal et al. | 708/625 |
| 2002/0089348 | A1 * | 7/2002 | Langhammer | 326/38 |

FOREIGN PATENT DOCUMENTS

| | | |
|---|---|---|
| EP | 0 461 798 | 12/1991 |
| GB | 2 283 602 | 5/1995 |
| WO | WO95/16993 | 6/1995 |

OTHER PUBLICATIONS

Altera Corp., "Implementing Logic with the Embedded Array in FLEX 10K Devices (Version 2.1)" (May 2001).

Quicklogic Corp., *The QuickDSP Design Guide*, Rev. B (Aug. 2001).

Quicklogic Corp., "QuickDSP Family Data Sheet," Rev. B (Aug. 7, 2001).

Xilinx, Inc., "Xilinx Unveils New FPGA Architecture to Enable High-Performance, 10 Million System Gate Designs" (Jun. 22, 2000).

Xilinx, Inc., "Xilinx Announces DSP Algorithms, Tools and Features for Virtex-II Architecture" (Nov. 21, 2000).

Xilinx, Inc., "Virtex-II 1.5V Field-Programmable Gate Arrays," module 2 of 4 (Jan. 25, 2001).

Xilinx, Inc., "Virtex-II 1.5V Field-Programmable Gate Arrays," module 1 of 4 (Apr. 2, 2001).

Xilinx, Inc., "Virtex-II 1.5V Field-Programmable Gate Arrays," module 2 of 4 (Apr. 2, 2001).

U.S. Appl. No. 10/463,688, filed Jun. 16, 2003, Tharmalingam.

Altera Corp., PIB 20, "Benefits of Embedded RAM in FLEX 10K Devices," (A-PIB-020-01), Jan. 1996.

Altera Corp., PIB 21, "Implementing Logic with the Embedded Array," (A-PIB-021-01), Jan. 1996.

Altera Corp., AN 52, "Implementing RAM Functions in FLEX 10K Devices," (A-AN-052-01), Nov. 1995.

Altera Corp., AN 53, "Implementing Multipliers in FLEX 10K Devices," (A-AN-053-01), Jan. 1996.

* cited by examiner

| A {23:0} | |
|---|---|
| B {11:0} | C {11:0} |

| A {17:0} | C {17:0} |
|---|---|
| B {17:0} | D {17:0} |

PROGRAMMABLE LOGIC DEVICE WITH SPECIALIZED FUNCTIONAL BLOCK

BACKGROUND OF THE INVENTION

This invention relates to programmable logic devices that include dedicated multipliers, and more particularly to such programmable logic devices in which the multipliers are used to perform multiplications of different sizes.

Programmable logic devices are well known. Early programmable logic devices were one-time configurable. For example, configuration may have been achieved by "blowing"—i.e., opening—fusible links. Alternatively, the configuration may have been stored in a programmable read-only memory. Those devices generally provided the user with the ability to configure the devices for "sum-of-products" (or "P-TERM") logic operations. Later, such programmable logic devices incorporating erasable programmable read-only memory (EPROM) for configuration became available, allowing the devices to be reconfigured.

Still later, programmable logic devices incorporating static random access memory (SRAM) elements for configuration became available. These devices, which also can be reconfigured, store their configuration in a nonvolatile memory such as an EPROM, from which the configuration is loaded into the SRAM elements when the device is powered up. These devices generally provide the user with the ability to configure the devices for look-up-table-type logic operations.

As programmable logic devices have become larger, it has become more common to add dedicated blocks to perform particular functions that have become more common in programmable logic devices. For example, at some point, such devices began to be provided with embedded blocks of random access memory that could be configured by the user to act as random access memory, read-only memory, or logic (such as P-TERM logic); such embedded blocks might even be provided in different sizes on the same device. Other types of memory, such as read-only memory (ROM) or shift registers, also have been provided. More recently, multiplier circuits have been provided on programmable logic devices. Whereas in prior programmable logic devices space was not available for dedicated multipliers, current larger devices can accommodate multipliers. This spares users from having to create multipliers by configuring the available logic. Moreover, as described in commonly-assigned U.S. Pat. No. 6,538,470, which is hereby incorporated by reference in its entirety, specialized multiplier blocks may be provided including multipliers and other arithmetic circuits such as adders and/or subtracters and/or accumulators. Such blocks are sometimes referred to as "multiplier-accumulator blocks" or "MAC blocks." Such blocks, for example, may be useful in digital signal processing, such as is performed in audio applications, and therefore such specialized multiplier blocks also are sometimes referred to as "DSP blocks."

Such specialized multiplier blocks typically are capable of operations up to a certain size. For example, a specialized multiplier block may be provided that can perform a single 36-bit-by-36-bit multiplication operation, or up to four individual 18-bit-by-18-bit multiplication operations which can be combined by the aforementioned adders. Such a specialized multiplier block can be used for performing multiplication operations of any size up to 36 bits by 36 bits. However, it may not be efficient to perform multiplication operations of a certain size. For example, if the specialized multiplier block is used to perform a 24-bit-by-24-bit multiplication operation, there will be unused resources in the block that may not be able to be used efficiently for any other kind of operation.

It would be desirable to be able to be able to provide a programmable logic device that can more flexibly utilize specialized functional blocks.

SUMMARY OF THE INVENTION

The present invention achieves greater flexibility in the use of a specialized functional block of the type described above by modifying that block to facilitate the performance, partially inside the block and partially outside the block, of functions that cannot be fully performed inside the block, where the functions that are performed inside the block leave resources inside the block unused. The modifications include making programmable connections available that allow, at the user's option, partial products computed outside the block to access one or more adders inside the block, to facilitate combining partial products computed inside and outside the block, to achieve a final product.

For example, in the case of a MAC/DSP block as described above, which is designed to perform one m-by-m multiplication operation, or to perform four m/2-by-m/2 multiplication operations and to add them together in two stages, there are four multipliers. The products output by two of the four multipliers are added together in a first adder, the products output by two others of the four multipliers are added together in a second adder, and the sums output by the two adders are added in a third adder. The total number of data inputs provided in such a block preferably is 4m, so that four m/2-by-m/2 multiplication operations, each of which requires m data inputs, can be performed (although the larger m-by-m multiplication operation requires only 2m data inputs).

An n-by-n multiplication operation, where n is smaller than m, but is other than m/2—e.g., n=3m/4—cannot necessarily be accomplished efficiently in a specialized functional block of the type described. Therefore, in accordance with the invention, the n-by-n multiplication operation is decomposed into an m/2-by-m/2 multiplication operation, an m/2-by-(n-minus-m/2) multiplication operation, an (n-minus-m/2)-by-m/2 multiplication operation, and an (n-minus-m/2)-by-(n-minus-m/2) multiplication operation to form four intermediate products. By shifting appropriate intermediate products to more significant bits in the manner described in more detail below, and then adding the intermediate products together, the desired product of the original n-by-n multiplication operation is obtained.

Of the four partial products, the m/2-by-m/2 multiplication operation can be performed in one of the multipliers of the specialized functional block, which is specifically designed for such a multiplication operation. However, as stated above, multiplication operations of other sizes may not be able to be efficiently performed inside the specialized functional block. Therefore, in accordance with the invention, one or more of the three multiplication operations other than the m/2-by-m/2 multiplication operation preferably are performed outside the specialized functional block in programmable logic of the programmable logic device. That leaves three of four multipliers, three adders, and 3m data inputs of the specialized functional block unused. In accordance with the invention, at least some of those resources may be used to combine the partial products obtained in programmable logic with the at least one partial product obtained inside the specialized functional block, to obtain the desired original product of the n-by-n multiplication operation. In order to use those resources for that purpose, programmable connections are provided to allow inputs of the specialized functional block to reach the adders as needed, and also the capability to bit-shift the partial products as needed preferably is provided.

Therefore, in accordance with the present invention, there is provided a method of performing multiplication operations of a first size in a programmable logic device having a specialized functional block configured to (1) perform multiplication operations of at least one other size, and (2) add together results of the multiplication operations of the at least one other size, where (a) each of the at least one other size is different from the first size, and (b) the at least one other size includes a second size different from the first size. The method includes decomposing the multiplication operation of the first size into a plurality of multiplication operations. The plurality of multiplication operations includes a multiplication operation of the second size and at least one other multiplication operation. The multiplication operation of the second size preferably is performed in the specialized functional block. The at least one other multiplication operation preferably is performed in programmable logic of the programmable logic device. Preferably, the specialized functional block is used to add together results of the multiplication operation performed in the specialized functional block and the at least one other multiplication operation performed in the programmable logic of the programmable logic device.

A specialized functional block configured to facilitate such a method, and a programmable logic device incorporating such a specialized functional block, are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, the present invention allows a multiplication operation of a first size to be performed in a programmable logic device in a specialized functional block designed to perform one or more multiplication operations of a second size, where the multiplication operation of the first size cannot efficiently be performed in the specialized functional block. In accordance with the present invention, the multiplication operation of the first size may be decomposed into a plurality of component multiplication operations including a multiplication operation of the second size. The component multiplication operation of the second size, and possibly others of the other component multiplication operations, can be performed in the specialized functional block, while the remaining component multiplication operations are performed in programmable logic of the programmable logic device. The partial products produced by the component multiplication operations are then combined using otherwise unused adders and other unused components of the specialized functional block. In accordance with the present invention, the specialized functional block may be designed to accommodate such combining operations.

Although performance of the original multiplication operation in this way is not as fast as performing the same operation in a dedicated multiplier of the correct size, having at least one of the partial products computed in a dedicated multiplier, while others are computed in programmable logic, is faster than having the entire multiplication performed in programmable logic. Having the partial products combined in dedicated adders, rather than in adders created in programmable logic, further improves the speed. Moreover, the use of dedicated multiplier circuitry, even for a portion of the multiplication operation, is more area efficient, and consumes less power, than performing the same operation in programmable logic.

In addition, if the size of the partial products is chosen correctly, it may be possible, instead of using the specialized functional block to perform all of a multiplication operation but leaving some of its resources unused, to use the specialized functional block to perform portions of two (or more) multiplication operations with all or almost all of the resources of the block being used. This improves efficiency by improving utilization of the resources of the specialized functional block, while at the same time reducing the amount of programmable logic resources required.

The invention will now be described with reference to FIGS. 1-5.

Figures 1, 2, 3:
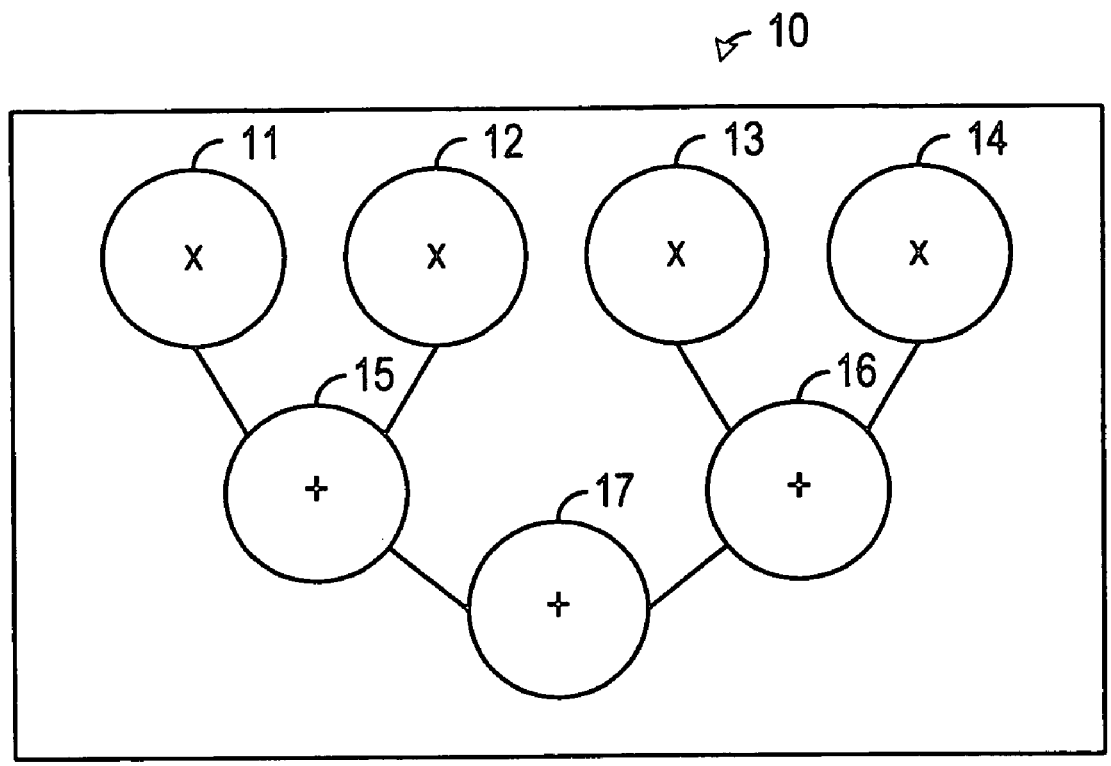
FIG. 1 is a schematic representation of a previously known specialized functional block.
FIG. 2 is a diagram showing the decomposition of a multiplication operation into two multiplication operations.
FIG. 3 is a diagram showing the decomposition of a multiplication operation into four multiplication operations.

A schematic representation of a previously known specialized functional block 10, an improvement of which is one aspect of the present invention, and with which improvement the method of the present invention may be used, is shown in FIG. 1. Specialized functional block 10 includes four multipliers 11-14, two first-level adders 15, 16—one of which adds the products of multipliers 11 and 12 and the other of which adds the products output by multipliers 13 and 14, and a second-level adder 17 which adds together, or accumulates (depending on how block 10 is configured) the sums output by adders 15, 16.

Although not shown in the schematic representation of FIG. 1, block 10, as a component of a programmable logic device, can be configured by the user. In one embodiment (not shown), multiplexers are provided to allow the output of each multiplier or adder to be conducted either to the next adder or directly to an output. In addition, parallel paths (not shown) with and without registers may be provided between components, with multiplexers (not shown) allowing selection of the registered or unregistered signal as the input to the downstream component. Similarly, registers (not shown) can be provided on the block inputs with multiplexers (not shown) provided allowing selection of registered or unregistered inputs. And again, a similar choice may be provided on the output end, allowing registered or unregistered outputs of various components to be selected. And a multiplexer (not shown) also may be provided allowing an input to be conducted directly to one of the adders (for use in accumulator mode).

As stated above, each of multipliers 11-14 preferably is capable of performing an m/2-by-m/2 multiplication operation, which also allows block 10 to perform a single m-by-m multiplication operation, as well as any single multiplication operation in which each operand is no larger than m. In accordance with the present invention, one or more of multipliers 11-14 is used to compute a partial product of an n-by-p multiplication operation where n<m and p<m, but the n-by-p multiplication operation does not efficiently use the resources of block 10.

Figure 4:
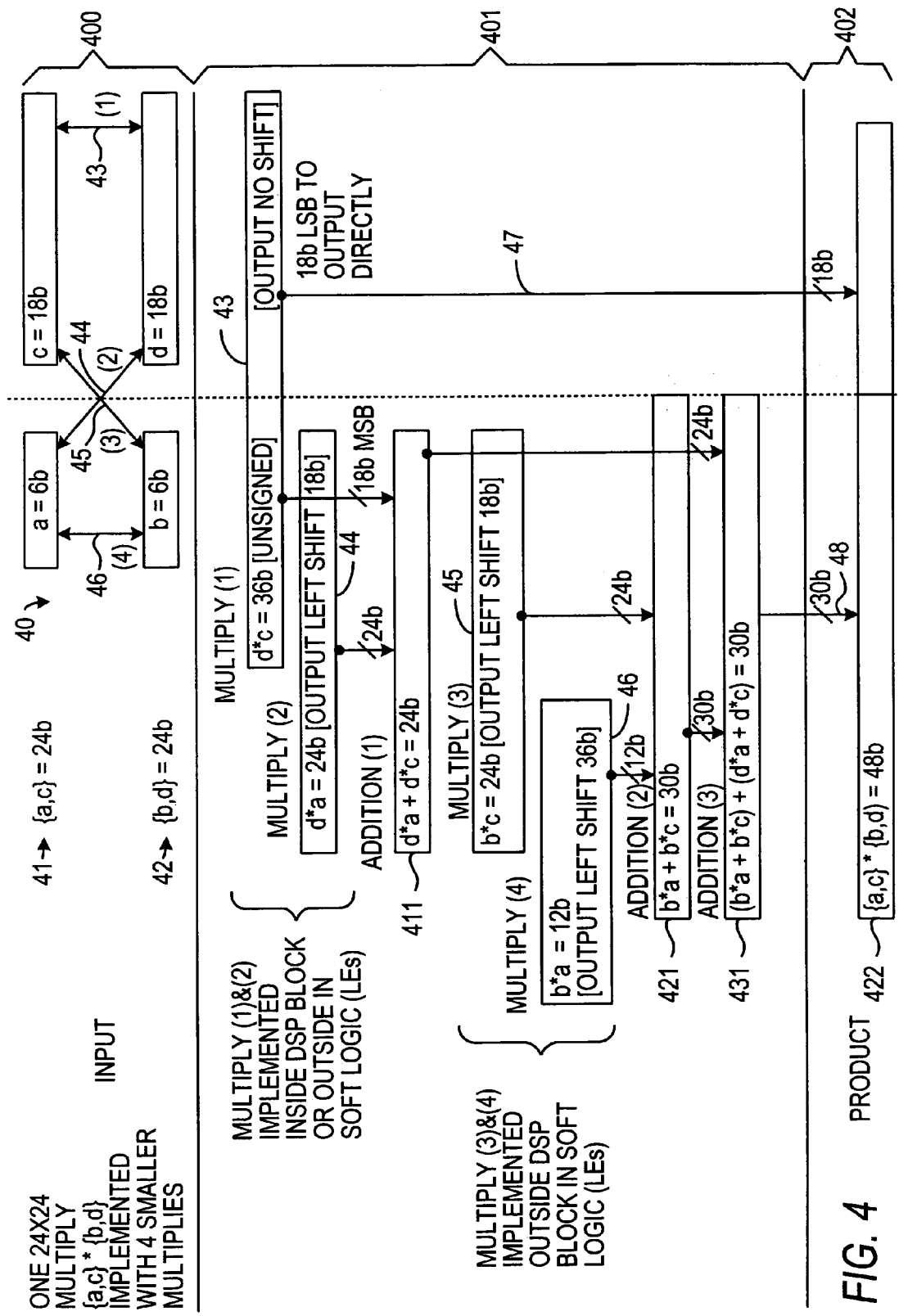
FIG. 4 is a more detailed diagram showing the decomposition of a multiplication operation into four multiplication operations.

It is well-known that any multiplication operation can be decomposed into two, four, or some other number of smaller multiplication operations as shown in FIGS. 2-4. For example, FIG. 2 shows the decomposition of a 24-bit-by-24-bit multiplication operation into two 24-bit-by-12-bit multiplication operations. In this case, the first operand is left as a 24-bit number A, while the second operand is expressed as the concatenation of two 12-bit numbers B, C. In the case of a signed multiplication operation, the result is {B,C}*A. This can also be expressed as the sum of two multiplication operations: C(unsigned)*A(signed)+B(signed)*A(signed). The B*A result must be left-shifted by 12 bits before the two results are added together. This same technique can be used for decomposition into any other widths. For example, B can be 6 bits wide and C can be 18 bits wide.

FIG. 3 shows the decomposition of a 36-bit-by-36-bit multiplication operation into four 18-bit-by-18-bit multiplication operations, where the first 36-bit operand is expressed as the concatenation of two 18-bit numbers A, C, and the second 36-bit operand is expressed as the concatenation of two 18-bit numbers B, D. With the width of each of A, B, C, and D being 18 bits, the four multiplication operations are:

$$D(unsigned)*C(unsigned), \quad (1)$$

$$D(unsigned)*A(signed), \quad (2)$$

$$B(signed)*C(unsigned), \text{ and} \quad (3)$$

$$B(signed)*A(signed). \quad (4)$$

Each of the D*A and B*C results must be shifted left by 18 bits before addition, while the B*A result must be shifted left 36 bits before addition.

The decomposition of an unsigned multiplication operation is similar, but each partial product will be unsigned. In signed multiplication, if either operand is signed, the product will be signed, requiring a sign extension when adding it to another number. Unsigned numbers would be zero-extended (i.e., padded with zeroes) rather than sign-extended.

In the specialized functional block shown in FIG. 1, 144 data inputs pins are provided to support four 18-bit-by-18-bit multiplication operations, each of which requires 36 data inputs (18+18). The 36-bit-by-36-bit multiplication operation is performed as four 18-bit-by-18-bit multiplication operations using the technique shown in FIG. 3. In the case of the 36-bit-by-36-bit multiplication operation, only 36+36=72 input data pins are needed, leaving 72 pins free for other uses. If two 36-bit-by-18-bit multiplication operations, or two 24-bit-by-18-bit multiplication operations would be performed using the technique shown in FIG. 2, then 144−2*(36+18)=36 data pins, or 144−2*(24+18)=60 data pins, respectively, would still be available. Also, each of these multiplication operations uses only two of the four multipliers and one of the available first-level adders, leaving the second level adder in the block free to add the results of any multiplications operations performed outside the specialized functional block—e.g., in programmable logic.

FIG. 4 shows the specific example of a 24-bit-by-24-bit multiplication operation 40 decomposed so that it can be performed by four smaller multipliers, where the largest available multiplier is 18-bits-by-18-bits. The Input section 400 of the diagram in FIG. 4 shows two 24-bit operands 41, 42, each of which is broken down for expression as the concatenation of an 18-bit number representing the least significant bits and a 6-bit number representing the most significant bits. Specifically, operand 41 is broken down into an 18-bit number, c, representing its 18 least significant bits, and a 6-bit number, a, representing its six most significant bits, while operand 42 is broken down into an 18-bit number, d, representing its 18 least significant bits, and a 6-bit number, b, representing its six most significant bits.

The double-ended arrows 43, 44, 45, 46 represent the partial products d*c, d*a, b*c and b*a, respectively, that must be performed in order to compute the final product {a,c}*{b,d}, where {a,c} is operand 41 (concatenation of a and c) and {b,d} is operand 42 (concatenation of b and d). The computation of the partial products 43-46, and the combining of those partial products by shifting and addition, is shown in Computation section 401 of the diagram in FIG. 4.

As shown in section 401, multiplication 43 of the respective 18-bit-wide least significant bit portions c and d of operands 41, 42 results in a 36-bit unsigned number. Because each of the other partial products will be shifted left by at least 18 bits, the 18 least significant bits of partial product 43 can be conducted, at 47, directly to the final product in Output section 402.

Multiplication 44 of 18-bit portion d by 6-bit portion a results, as shown, in a 24-bit number that is shifted left by 18 bits because a is shifted left by 18 bits with respect to the least significant bits of the operands. Partial product 44 preferably is added to the 18 most significant bits of partial product 43 to form 24-bit intermediate sum 411. It should be noted that although partial product 44 is described, thus far, and shown, as being 24 bits wide, it may actually be 25 bits wide because of wordgrowth.

Similarly, multiplication 45 of 18-bit portion c by 6-bit portion b results, as shown, in a 24-bit number that is shifted left by 18 bits because b is shifted left by 18 bits with respect to the least significant bits of the operands. Multiplication 46 of 6-bit portion a by 6-bit portion b results in a 12-bit number that is shifted left by 36 bits because each of a and b is shifted left by 18 bits with respect to the least significant bits of the operands. Partial products 45 and 46 preferably are then added together to form 30-bit intermediate sum 421. 30-bit intermediate sum 421 preferably is then added to 24-bit intermediate sum 411 to form 30-bit final sum 431 which represents the 30 most significant bits of final product 422, to which it is conducted at 48.

It will be apparent to one of ordinary skill that when partial products (or other numbers) to be added do not have the same number of bits, one of the partial products must be sign-extended, or in the case of unsigned multiplication zero-extended (padded with leading zeroes) prior to being added.

If a user logic design includes only a single multiplication of the type shown in FIG. 4, the previously-known specialized functional block as shown in FIG. 1 can be used to perform that multiplication, in which each of the four multipliers 11-14 computes one of the four partial products and the first and second level adders are used to combine the partial products into the final product.

However, using an 18-bit-by-18-bit multiplier to perform a 6-bit-by-6-bit multiplication, or even an 18-bit-by-6-bit multiplication, is not the most efficient use of an 18-bit-by-18-bit multiplier. Therefore, if the user design includes two 24-bit-by-24-bit multiplication operations, it is more efficient to use the specialized functional block to compute the larger partial products in each of the two 24-bit-by-24-bit multiplication operations, and to compute the smaller partial products in programmable logic of the programmable logic device. A preferred embodiment of such a method 50 in accordance with this invention, as implemented in a programmable logic device 60 incorporating a preferred embodiment of a specialized functional block 500 in accordance with this invention, is shown in FIG. 5.

Figure 5:
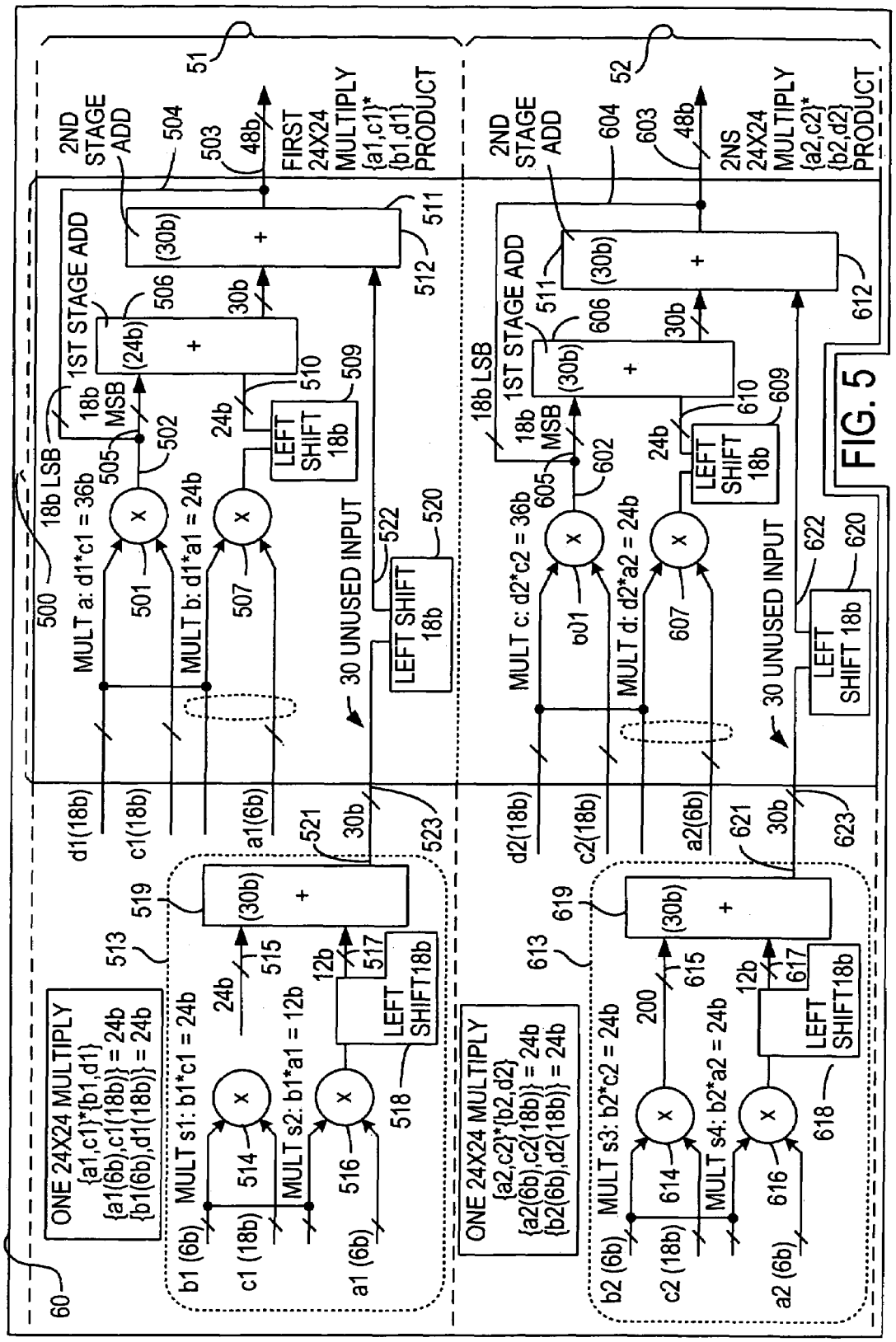
FIG. 5 is a schematic diagram of a preferred embodiment of a specialized functional block in accordance with the present invention.

The upper portion 51 of FIG. 5 shows the multiplication of two 24-bit operands, each of which can be expressed as the concatenation of a 6-bit number representing its six most significant bits and an 18-bit number representing its least significant bits. Thus the first operand is represented as {a1, c1} and the second operand is represented as {b1,d1}, and the operation to be performed is the multiplication {a1,c1}*{b1, d1}. The d1*c1 partial multiplication is performed in multiplier 501 of specialized functional block 500 to produce a 36-bit partial product at 502. The 18 least significant bits of that partial product are routed directly to output 503 by least-significant-bit bypass 504, while the 18 most significant bits of that partial product are routed at 505 to 24-bit first-level adder 506. The d1*a1 partial multiplication is performed in multiplier 507 of specialized functional block 500 to produce a 24-bit partial product at 508. This 24-bit partial product is routed at 510 to 24-bit first-level adder 506. Comparison to FIG. 4 shows that this partial product should be shifted left 18 bits. No actual bit shifting circuitry is required here because the presence of least-significant-bit bypass 504 means that the outputs of adders 506 and 512 already are shifted left 18 bits. However, in other embodiments, explicit bit shifting circuitry 509, the structure of which would be readily apparent to one of ordinary skill, may be provided.

Second-level adder 511 is 60 bits wide. Preferably, in accordance with this invention, second-level adder 511 is split, in a manner that would be readily apparent to one of ordinary skill, into two 30-bit-wide adder portions 512, 612.

The 30-bit-wide output of first-level adder 506 preferably is routed to portion 512 of second-level adder 511. The other 30 inputs 522 to portion 512 of second-level adder 511 are programmably connected to inputs of specialized functional block 500 (as discussed above, 60 inputs are otherwise unused), where they preferably receive the results of the b1*c1 and b1*a1 multiplications performed in programmable logic 513. Programmable logic 513 preferably is used to implement multiplier 514 for performing the b1*c1 multiplication, producing 24-bit partial product 515. Also implemented in programmable logic 513 is multiplier 516 for performing the b1*a1 multiplication, producing 12-bit partial product 517. Bit shifting circuitry 518 is implemented in programmable logic 513 to shift partial product 517 to the left by 18 bits to create a 30-bit number which is added to partial product 515, forming sum 521, by 30-bit adder 519 also implemented in programmable logic 513. Comparison to FIG. 4 shows that sum 521 should be shifted left 18 bits. No actual bit shifting circuitry is required here because the presence of least-significant-bit bypass 504 means that the outputs of adders 519 and 512 already are shifted left 18 bits. However, in other embodiments, bit shifting circuitry 520, the structure of which would be readily apparent to one of ordinary skill, optionally may be provided, preferably in block 500. It will be seen that the combination of first bit shifter 518 and second bit shift (whether provided by optional bit shifter 520 or otherwise) provides a total shift of 18 bits for the b1*c1 partial product, and a total shift of 36 bits for the b1*a1 partial product, both as expected in accordance with the discussion of FIG. 4.

Shifted sum 521 is input at 523 to portion 512 of second-level adder 511 via inputs 522. Portion 512 of second-level adder 511 produces a sum representing the 30 most significant bits of output 503, and those 30 bits are concatenated with the 18 least significant bits of bypass 504 to produce output 503.

The operation of lower portion 52 of FIG. 5 is similar.

The lower portion 52 of FIG. 5 shows the multiplication of two 24-bit operands, each of which can be expressed as the concatenation of a 6-bit number representing its six most significant bits and an 18-bit number representing its least significant bits. Thus the first operand is represented as {a2, c2} and the second operand is represented as {b2,d2}, and the operation to be performed is the multiplication {a2,c2}*{b2, d2}. The d2*c2 partial multiplication is performed in multiplier 601 of specialized functional block 500 to produce a 36-bit partial product at 602. The 18 least significant bits of that partial product are routed directly to output 603 by least-significant-bit bypass 604, while the 18 most significant bits of that partial product are routed at 605 to 24-bit first-level adder 606. The d2*a2 partial multiplication is performed in multiplier 607 of specialized functional block 500 to produce a 24-bit partial product at 608. Comparison to FIG. 4 shows that this partial product should be shifted left 18 bits. No actual bit shifting circuitry is required here because the presence of least-significant-bit bypass 604 means that the outputs of adders 606 and 612 already are shifted left 18 bits. However, in other embodiments, explicit bit shifting circuitry 609, the structure of which would be readily apparent to one of ordinary skill, may be provided. That 24-bit partial product is shifted left 18 bits by bit shifting circuitry 609.

The 30-bit-wide output of first-level adder 606 preferably is routed to portion 612 of second-level adder 511. The other 30 inputs 622 to portion 612 of second-level adder 511 are programmably connected to inputs of specialized functional block 500, where they preferably receive the results of the b2*c2 and b2*a2 multiplications performed in programmable logic 613. Programmable logic 613 preferably is used to implement multiplier 614 for performing the b2*c2 multiplication, producing 24-bit partial product 615. Also implemented in programmable logic 613 is multiplier 616 for performing the b2*a2 multiplication, producing 12-bit partial product 617. Bit shifting circuitry 618 is implemented in programmable logic 613 to shift partial product 617 to the left by 18 bits to create a 30-bit number which is added to partial product 615, forming sum 621, by 30-bit adder 619 also implemented in programmable logic 613. Comparison to FIG. 4 shows that sum 621 should be shifted left 18 bits. No actual bit shifting circuitry is required here because the presence of least-significant-bit bypass 604 means that the outputs of adders 619 and 612 already are shifted left 18 bits. However, in other embodiments, bit shifting circuitry 620, the structure of which would be readily apparent to one of ordinary skill, may optionally be provided, preferably in block 500. It will be seen that the combination of first bit shifter 618 and the second bit shift (whether provided by optional bit shifter 620 or otherwise) provides a total shift of 18 bits for the b2*c2 partial product, and a total shift of 36 bits for the b2*a2 partial product, both as expected in accordance with the discussion of FIG. 4.

Shifted sum 621 is input at 623 to portion 612 of second-level adder 511 via inputs 622. Portion 612 of second-level adder 511 produces a sum representing the 30 most significant bits of output 603, and those 30 bits are concatenated with the 18 least significant bits of bypass 604 to produce output 603.

The operation of specialized functional block 500 in the manner just described, to perform portions of two different 24-bit-by-24-bit multiplications, is more efficient than using specialized functional block 500 to perform all of only one multiplication operation. As used, the four 18-bit-by-18-bit multipliers of specialized functional block 500 are used for two 18-bit-by-18-bit multiplications and two 18-bit-by-6-bit multiplications, rather than one 18-bit-by-18-bit multiplication, one 6-bit-by-6-bit multiplication and two 18-bit-by-6-bit multiplications. The total number of input bits for one 18-bit-by-18-bit multiplication operation and one 18-bit-by-6-bit multiplication operation would appear to be (18+18+18+6)=60. However, 18 of those bits overlap, so the total number of inputs per set is 42. For two sets of operations in block 500, then, the number of inputs used is 84, leaving 60 unused inputs from the original 144 inputs. This is precisely the number needed to accommodate lines 522, 622 as shown. The advantage of this arrangement in area and power consumption outweighs any disadvantage that may appear in the form of pipelining necessary in the programmable logic portions and, to maintain synchronicity, pipelining in certain signal paths in block 500 as well.

Other implementations of a multiplication operation using specialized functional block 500 as described may be possible. For example, in addition to performing some of the partial products and some of the first-level additions in programmable logic of the programmable logic device, it may be possible to implement the final addition in programmable logic of the programmable logic device. In such an embodiment (not shown) the multipliers, first-level adders, bit shifters and least-significant-bit bypass are used, but not the second level adder.

Figure 6:
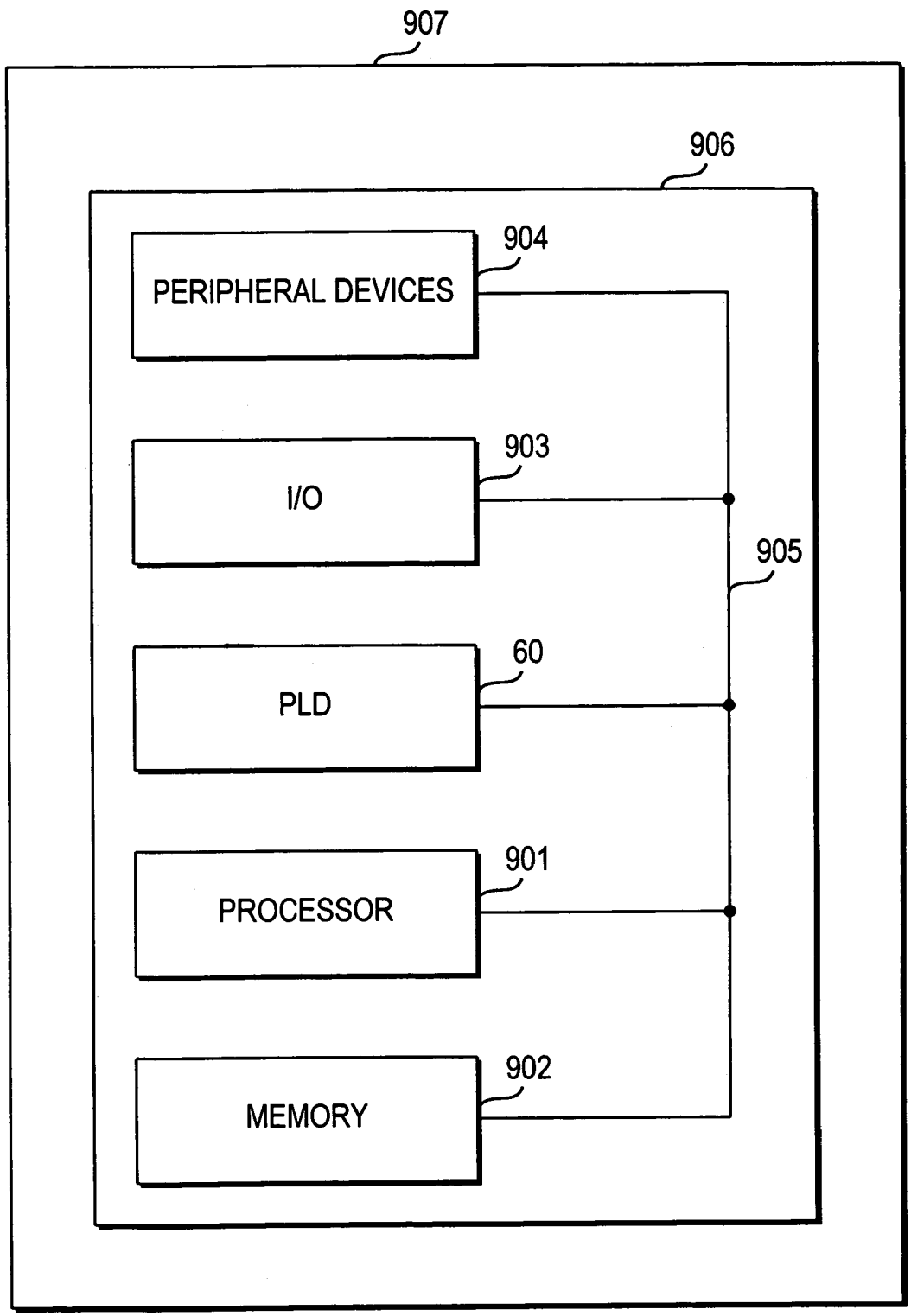
FIG. 6 is a schematic representation of a system including a programmable logic device incorporating the present invention.

A programmable logic device ("PLD") 60 incorporating a specialized functional block according to the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 60 can be used to perform a variety of different logic functions. For example, PLD 60 can be configured as a processor or controller that works in cooperation with processor 901. PLD 60 may also be used as an arbiter for arbitrating access to a shared resources in system 900. In yet another example, PLD 60 can be configured as an interface between processor 901 and one of the other components in system 900. It should be noted that system 900 is only exemplary, and that the true scope and spirit of the invention should be indicated by the following claims.

Various technologies can be used to implement PLDs 60 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A specialized functional block for use in a programmable logic device, said specialized functional block comprising:
    a plurality of block inputs;
    a plurality of dedicated multiplier circuits having multiplier inputs connected to said block inputs, and having multiplier outputs;
    a plurality of first-level dedicated adder circuits having first-level adder inputs and first-level adder outputs; and
    programmable connections between said multiplier outputs and said first-level adder inputs whereby said specialized functional block is configurable to add together in said first-level adders products output by said dedicated multiplier circuits; wherein:
    said programmable connections include respective programmable bit-shifting circuitry associated with each respective one of said dedicated multiplier circuits, for programmably shifting, to more significant bits, bits of said product output by said respective one of said dedicated multiplier circuits, said respective programmable bit shifting circuitry comprising bit diversion circuitry for diverting bits of lesser significance, in a respective product output by said respective one of said dedicated multiplier circuits, from said first-level adder inputs.

2. The specialized functional block of claim 1 further comprising:
    a second-level dedicated adder circuit for adding together sums output by said first-level dedicated adder circuits, said second-level dedicated adder circuit having second-level adder inputs programmably connected to said block inputs; whereby:
    data on said block inputs is added to a sum output by one of said first-level dedicated adder circuits.

3. A programmable logic device comprising the specialized functional block of claim 1.

4. A digital processing system comprising:
    processing circuitry;
    a memory coupled to said processing circuitry; and
    a programmable logic device as defined in claim 3 coupled to the processing circuitry and the memory.

5. A printed circuit board on which is mounted a programmable logic device as defined in claim 3.

6. The printed circuit board defined in claim 5 further comprising:
    memory circuitry mounted on the printed circuit board and coupled to the programmable logic device.

7. The printed circuit board defined in claim 6 further comprising:
    processing circuitry mounted on the printed circuit board and coupled to the memory circuitry.

8. An integrated circuit device comprising the specialized functional block of claim 1.

9. A digital processing system comprising:
    processing circuitry;
    a memory coupled to said processing circuitry; and
    an integrated circuit device as defined in claim 8 coupled to the processing circuitry and the memory.

10. A printed circuit board on which is mounted an integrated circuit device as defined in claim 8.

11. The printed circuit board defined in claim 10 further comprising:
    memory circuitry mounted on the printed circuit board and coupled to the integrated circuit device.

12. The printed circuit board defined in claim 11 further comprising:
    processing circuitry mounted on the printed circuit board and coupled to the memory circuitry.

13. A specialized functional block for use in a programmable logic device, said specialized functional block comprising:
    a plurality of block inputs;
    a plurality of dedicated multiplier circuits having multiplier inputs connected to said block inputs, and having multiplier outputs;
    a plurality of first-level dedicated adder circuits having first-level adder inputs and first-level adder outputs;

first programmable connections between said multiplier outputs and said first-level adder inputs whereby said specialized functional block is configurable to add together in said first-level adders products output by said dedicated multiplier circuits;

respective bit diversion circuitry associated with each respective one of said dedicated multiplier circuits, for diverting bits of lesser significance, in a respective product output by said respective one of said dedicated multiplier circuits, from said first-level adder inputs;

a second-level dedicated adder circuit, having second-level adder inputs, for adding together sums output by said first-level dedicated adder circuits; and second programmable connections between said block inputs and said second-level adder inputs for adding data on said block inputs to a sum output by one of said first-level dedicated adder circuits.

14. A programmable logic device comprising the specialized functional block of claim 13.

15. A digital processing system comprising:
processing circuitry;
a memory coupled to said processing circuitry; and
a programmable logic device as defined in claim 14 coupled to the processing circuitry and the memory.

16. A printed circuit board on which is mounted a programmable logic device as defined in claim 14.

17. The printed circuit board defined in claim 16 further comprising:
memory circuitry mounted on the printed circuit board and coupled to the programmable logic device.

18. The printed circuit board defined in claim 17 further comprising:
processing circuitry mounted on the printed circuit board and coupled to the memory circuitry.

19. An integrated circuit device comprising the specialized functional block of claim 13.

20. A digital processing system comprising:
processing circuitry;
a memory coupled to said processing circuitry; and
an integrated circuit device as defined in claim 19 coupled to the processing circuitry and the memory.

21. A printed circuit board on which is mounted an integrated circuit device as defined in claim 19.

22. The printed circuit board defined in claim 21 further comprising:
memory circuitry mounted on the printed circuit board and coupled to the integrated circuit device.

23. The printed circuit board defined in claim 22 further comprising:
processing circuitry mounted on the printed circuit board and coupled to the memory circuitry.

24. A specialized functional block for use in a programmable logic device, said specialized functional block comprising:
a plurality of block inputs;
a plurality of dedicated multiplier circuits having multiplier inputs connected to said block inputs, and having multiplier outputs;
a plurality of dedicated adder circuits having adder inputs and adder outputs;
first programmable connections between said multiplier outputs and said adder inputs whereby said specialized functional block is configurable to add together in said adders products output by said dedicated multiplier circuits, said first programmable connections including respective bit diversion circuitry associated with each respective one of said dedicated multiplier circuits, for diverting bits of lesser significance, in a respective product output by said respective one of said dedicated multiplier circuits, from said adder inputs; and
second programmable connections between said block inputs and said adder inputs for adding data on said block inputs to a product output by one of said dedicated multiplier circuits.

25. A programmable logic device comprising the specialized functional block of claim 24.

26. A digital processing system comprising:
processing circuitry;
a memory coupled to said processing circuitry; and
a programmable logic device as defined in claim 25 coupled to the processing circuitry and the memory.

27. A printed circuit board on which is mounted a programmable logic device as defined in claim 25.

28. The printed circuit board defined in claim 27 further comprising:
memory circuitry mounted on the printed circuit board and coupled to the programmable logic device.

29. The printed circuit board defined in claim 28 further comprising:
processing circuitry mounted on the printed circuit board and coupled to the memory circuitry.

30. An integrated circuit device comprising the specialized functional block of claim 24.

31. A digital processing system comprising:
processing circuitry;
a memory coupled to said processing circuitry; and
an integrated circuit device as defined in claim 30 coupled to the processing circuitry and the memory.

32. A printed circuit board on which is mounted an integrated circuit device as defined in claim 30.

33. The printed circuit board defined in claim 32 further comprising:
memory circuitry mounted on the printed circuit board and coupled to the integrated circuit device.

34. The printed circuit board defined in claim 33 further comprising:
processing circuitry mounted on the printed circuit board and coupled to the memory circuitry.

\* \* \* \* \*